United States Patent [19]

Gusmano

[11] Patent Number: 5,796,877
[45] Date of Patent: Aug. 18, 1998

[54] METHOD AND APPARATUS FOR AUTOMATICALLY FITTING AN INPUT IMAGE TO THE SIZE OF THE OUTPUT DOCUMENT

[75] Inventor: Donald J. Gusmano, Henrietta, N.Y.

[73] Assignee: Xerox Corporation, Stamford, Conn.

[21] Appl. No.: 570,064

[22] Filed: Dec. 11, 1995

[51] Int. Cl.$^6$ .................................................. G06K 9/42
[52] U.S. Cl. ................................... 382/298; 358/464
[58] Field of Search ......................... 382/298, 282, 382/270, 272, 176, 294; 358/464, 451, 453

[56] References Cited

U.S. PATENT DOCUMENTS

| | | | |
|---|---|---|---|
| 5,138,670 | 8/1992 | Nakajima et al. | 382/298 |
| 5,282,061 | 1/1994 | Farrell | 358/464 |
| 5,392,362 | 2/1995 | Kimura et al. | 382/176 |
| 5,589,949 | 12/1996 | Miyaza et al. | 382/298 |
| 5,613,017 | 3/1997 | Rao et al. | 382/298 |

Primary Examiner—Yon J. Couso
Attorney, Agent, or Firm—Michael J. Nickerson

[57] ABSTRACT

In an auto-fitting mode, a scanner prescans an input document to determine the location and size of an image within the input document. The area of the image is defined in terms of a rectangular area encompassing all area of the input document where the reflectance of the image data is less than 20% of the reflectance value of the input documents background. Once the image area has been defined, a magnification factor is calculated. The input document is then rescanned applying the calculated magnification factor and properly registered so that the image area can be centered when it is rendered on to the desired output paper. If the image area detected is such that the longer side of the rectangular area does not have the same orientation as the desired output paper, the image is automatically rotated prior to the magnification and registering processes. The magnification factor can be calculated either anamorphically or isotropically.

6 Claims, 4 Drawing Sheets

5,796,877

1

METHOD AND APPARATUS FOR AUTOMATICALLY FITTING AN INPUT IMAGE TO THE SIZE OF THE OUTPUT DOCUMENT

FIELD OF THE PRESENT INVENTION

The present invention is directed to a method and system for automatically fitting an input image to the size of an output recording medium or output document. More specifically, the present invention is directed to a method and system which measures the size of the input image and the size of the output document and scales or sizes the input image accordingly so that the input image automatically fits appropriately on the output document.

BACKGROUND OF THE PRESENT INVENTION

Input images usually have a size that correspond to the output document or output recording medium ("output document"). However, there are instances when the size of the input image does not appropriately correspond to the size of the output document. For example, the size of the input image may only be 2" by 4", and the size of the output document may be 8.5" by 11". On the other hand, the size of the input image size may be 20" by 30", and the size of the output document may be 8.5" by 11". If the user wanted to fit the input images to the output document using a conventional copier, the user would be required to utilize a trial and error process.

More specifically, with respect to the first example, the user would place the input document with the input image in (on) the scanning station, select an initial magnification factor (enlargement factor), and look at the produced output document to determine whether the input image was sized to fit correctly on the output document. Most likely, the input image would not be sized correctly to fit on the output document the first time, and thus, the user would have to do the process again using a different magnification factor. Moreover, the user may have to adjust the position of the input Image in (on) the scanning station to a location which will allow it to fit properly on the output document.

Utilizing such a process to fit an input image onto an output document, the user may be required to carry out the scanning/rendering process numerous times before the input image is properly fitted on the output document. Performing the fitting process numerous times wastes both the time of the user as well as the user's resources with respect to marking material and the recording medium used as the output document.

Therefore, it is desirable to utilize a fitting process which does not require the user to continually select magnification factors and analyze each output document to determine when a perfect fit is obtained. More specifically, it is desirable to have a system which automatically fits the input image to the size of the output document the first time without relying on the user to select the exact magnification factor to achieve this result.

SUMMARY OF THE PRESENT INVENTION

One aspect of the present invention is a method for automatically fitting an image to an output document. This method isolates an image area on an input document and determines the size of the image area. Moreover, the method determines the size of the output document and scales the

2 image area to correspond to the size of the output document. Once the image area has been scaled, the method renders the scaled image area on the output document.

A second aspect of the present invention is a system which automatically fits an image to an output document. The system includes image area means for, isolating an image area on an input document and for determining a size thereof. The system further includes output size means for determining a size of the output document, magnification means for scaling the image area to correspond to the size of output document, and output means for rendering the scaled image area on the output document.

Further objects and advantages of the present invention will become apparent from the following description of the various features of the present invention.

BRIEF DESCRIPTION OF THE DRAWINGS

The following is a brief description of each drawing used in describing the present invention, and thus, the drawings are being presented for illustrative purposes only and should not be limitative of the scope of the present invention, wherein.

DETAILED DESCRIPTION OF THE DRAWINGS

Figure 1:
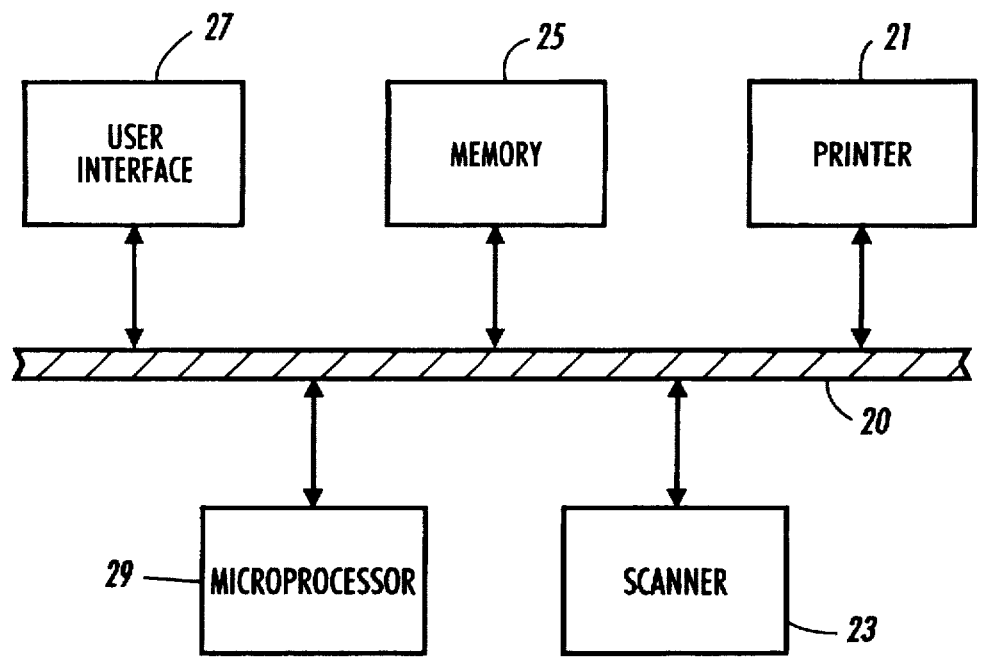
FIG. 1 is a block diagram illustrating a copier system's architecture which is capable of carrying out the concepts of the present invention.

The following is a detailed description of the drawings illustrating the present invention. In this description, as well as in the drawings, like reference numerals have been utilized to represent like devices, circuits, or equivalent circuits performing the same or equivalent functions.

As noted above, FIG. 1 illustrates the architecture of a copier system which is capable of carrying out the concepts of the present invention. As illustrated in FIG. 1, the copier system includes a user interface 27 which allows the user to select the automatic fitting mode ("auto-fitting mode") when the user desires to size an input image to appropriately fit on the output recording medium or output document. The selection of the auto-fitting mode, through the user interface 27, is communicated to a microprocessor 29 through bus 20. The microprocessor 29 controls the various processes and subsystems of the copier system so as to carry out the auto-fitting process as well as the other scanning and printing operations. The microprocessor 29 is also connected a memory 25, a printing system or printer 21, and a scanner or a scanning station 23 through bus 20.

Upon receiving the auto-fit instruction and a copy instruction from the user interface 27, the microprocessor 29 instructs the scanner 23 to begin scanning the input document containing the input image The scanner 23 scans the input document to produce image data which is stored in a memory 25. Memory 25 is capable of storing the entire image area needed to be printed by the printer 21. Once the image data begins to be placed in the memory 25, the microprocessor 29 retrieves this image data so as to determine which image data represent the image area and from this determination the actual size of the image area. These functions can also be carried out in an image processing circuit, image processing system, or image processing module, thus freeing up the microprocessor to do other tasks. Upon isolating the image area from the other image data in the memory 25, the microprocessor 29 determines the scaling factor by determining the ratio of the size of the output document to the size of the image area.

For example, if a user places an 8.5" by 11" input document in the scanning system wherein the image area is only on ¼ of the input document, and the output recording medium size is also 8.5" by 11", the microprocessor 29 would determine that the image area needs to be magnified by 200% so that the image area can be fitted properly on the output document.

Once the microprocessor 29 determines the scaling factor or magnification factor, the microprocessor 29 scales the isolated image area in memory 25 accordingly and causes the printer 21 to print or render this scaled image area on the output document.

Figure 2:
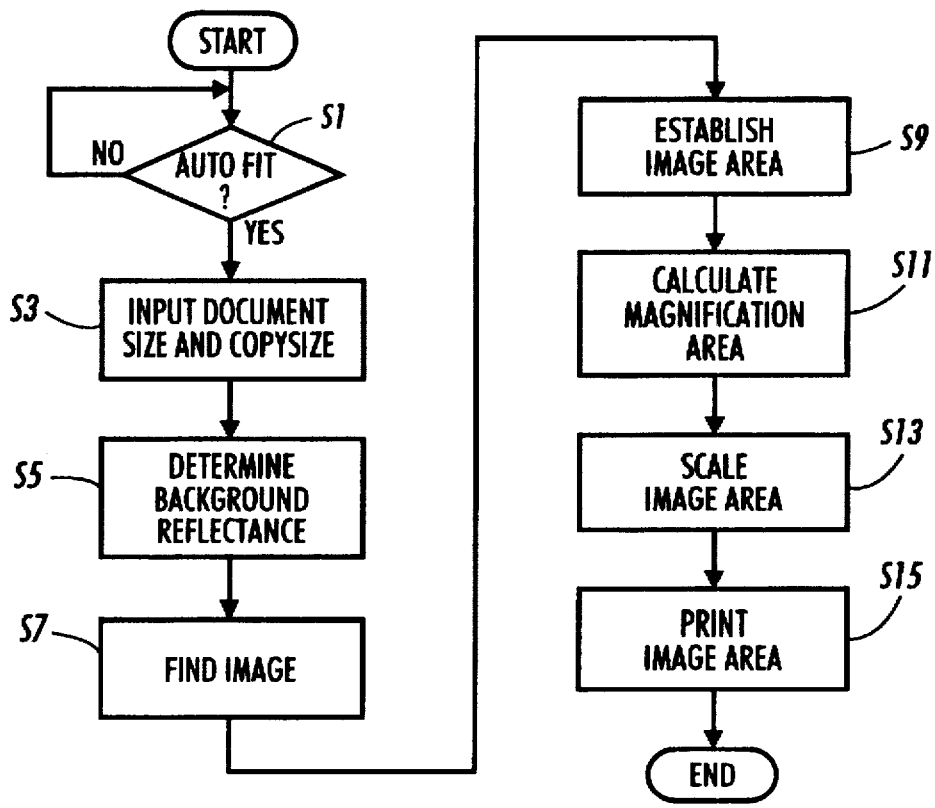
FIG. 2 is a flowchart illustrating a preferred embodiment of the auto-fitting process of the present invention.

FIG. 2 illustrates a flowchart which shows in more detail the automatic fitting process carried out by the present invention. As illustrated in FIG. 2, the present invention determines at step S1 whether the auto-fit mode has been selected by the user. If the auto-fit mode has been selected, in one embodiment of the present invention, the user will then input the size of the input document and the size of the output document at step S3.

In another embodiment of the present invention, the size of the input document and the size of the output document are sensed automatically. More specifically, the size of the input document is determined utilizing a prescan of the input document utilizing conventional and well known edge detecting processes to determine the size of the input document. Moreover, the size of the output document is detected by utilizing a sensor or sensors that sense the size of the output document in a feeder tray. Such sensing methods and devices are well known and thus will not be explained in great detail.

After the size of the input document and the output document are established, the background reflectance of the input document is determined at step S5. In the preferred embodiment of the present invention, the background reflectance is determined by scanning a predetermined number of scanlines or a predetermined area of the input document to generate a plurality of pixels each having a reflectance value. The reflectance values of these pixels are then averaged, and the average value is chosen as the background reflectance value of the input document. The background reflectance value of the input document can also be determined by prescanning the entire input document and producing a histogram of the input document. From this histogram, utilizing conventional and well known methods, the background reflectance value can be determined.

The established background reflectance value is utilized in step S7 to determine which pixels of image data represent the image area on the input document. More specifically, if the reflectance value of a certain pixel of image data is less than a predetermined threshold which is related to the reflectance value of the background of the input document, the present invention will classify this pixel as being part of the image area. In a preferred embodiment of the present invention, the threshold to determine whether a pixel is part of the image area or not is equal to 20% of the reflectance value of the background of the input document.

Moreover, to prevent incorrect classification of dirt, dust, or stray marks as being part of the image area, the present invention can utilize a one-dimensional or two-dimensional window wherein each pixel within the window must be below the threshold before the pixels are classified as being part of the image area. More specifically, if only a single pixel within a 10 pixel window has a reflectance below the threshold value, these pixels are not classified as being part of the image area because the isolated pixel is most likely the result of dirt, dust, or electrical noise within the system.

Once all the pixels have been classified as being either in the image area or outside the image area, step S9 establishes the actual boundaries of the image area, and thus, the present invention can calculate the actual size of the image area. Thereafter, the present invention calculates the magnification value as a ratio of the size of the output document to the size of the image area.

As discussed above, if the input document is 8.5" by 11" but the image area on the input document is only ¼ of the entire 8.5' by 11" document and the output document has a size of 8.5" by 11", the magnification factor for the situation would be determined to be 200%. The image area is then scaled at step S13 and properly registered in the memory so that the image will be centered upon the output document. Once the image area has properly been scaled and registered within the memory, step S15 renders the scaled and registered image area on the output document to produce a properly fitted copy of the input image area.

Figure 3:
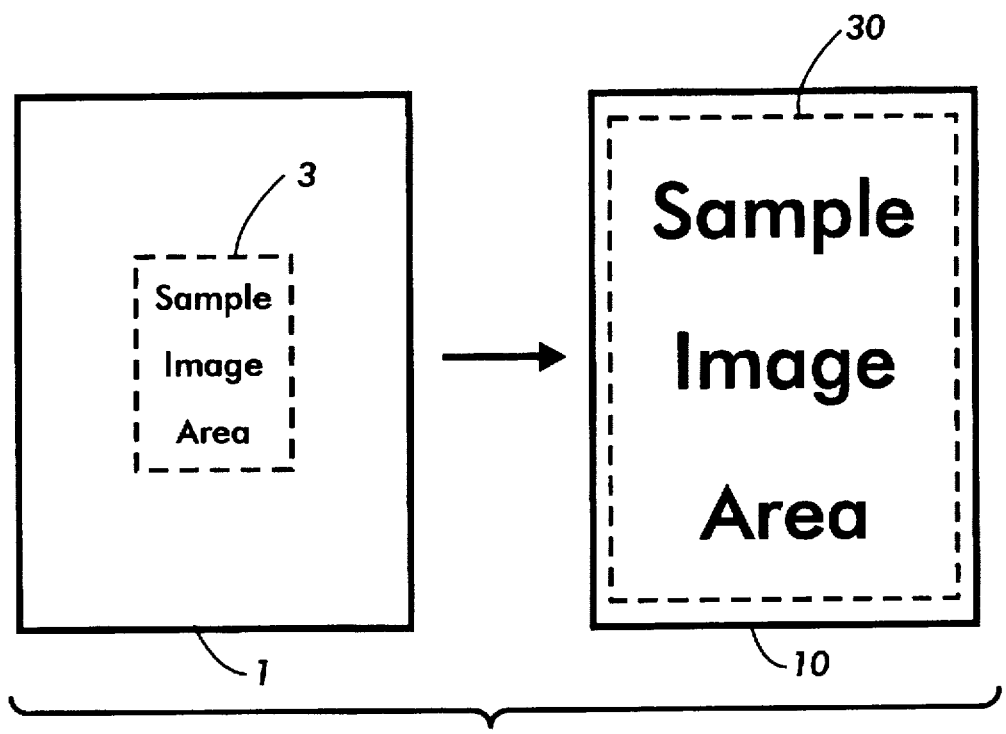
FIG. 3 is an illustration showing a graphical representation of the concepts of the present invention.

FIGS. 3–6 illustrate examples as to how the present invention can be utilized for automatically fitting an image area to an output document. For example, as illustrated in FIG. 3, an input document 1 having an image area 3 is scanned by the present invention such that the image area 3 is magnified and properly registered to produce an image area 30 on the output document 10. In this example, the present invention isolates the image area 3, determines its size, and scales it according to the ratio between the size of the output document to the size of the image area.

Figure 4:
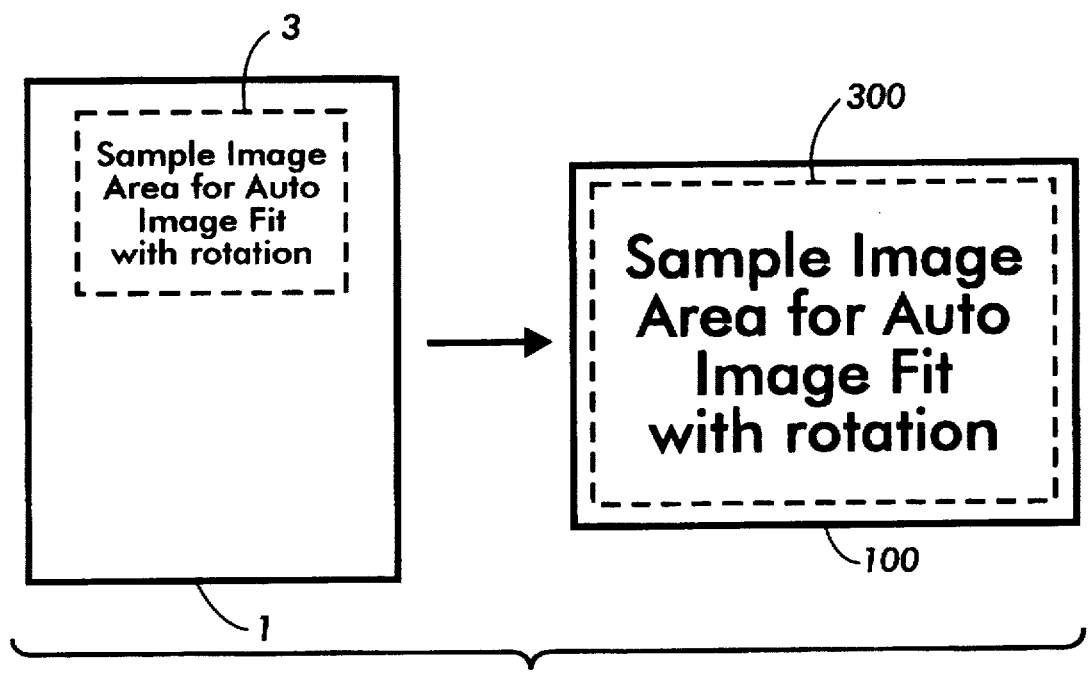
FIG. 4 is an illustration showing another graphical representation of the concepts of the present invention.

The present invention can also utilize rotation in its auto-fitting process, as illustrated in FIG. 4. In this example, the input document 1 includes an image area 3 wherein the orientation of the input document 1 is different from the orientation of the output document by 90°. To invoke the rotation process, the present invention determines if the long side of the rectangular area of the image area has the same orientation as the desired output document. If the orientation is not the same, the image area will be automatically rotated before the image area is scaled and registered to fit properly upon the output document.

Figure 5:
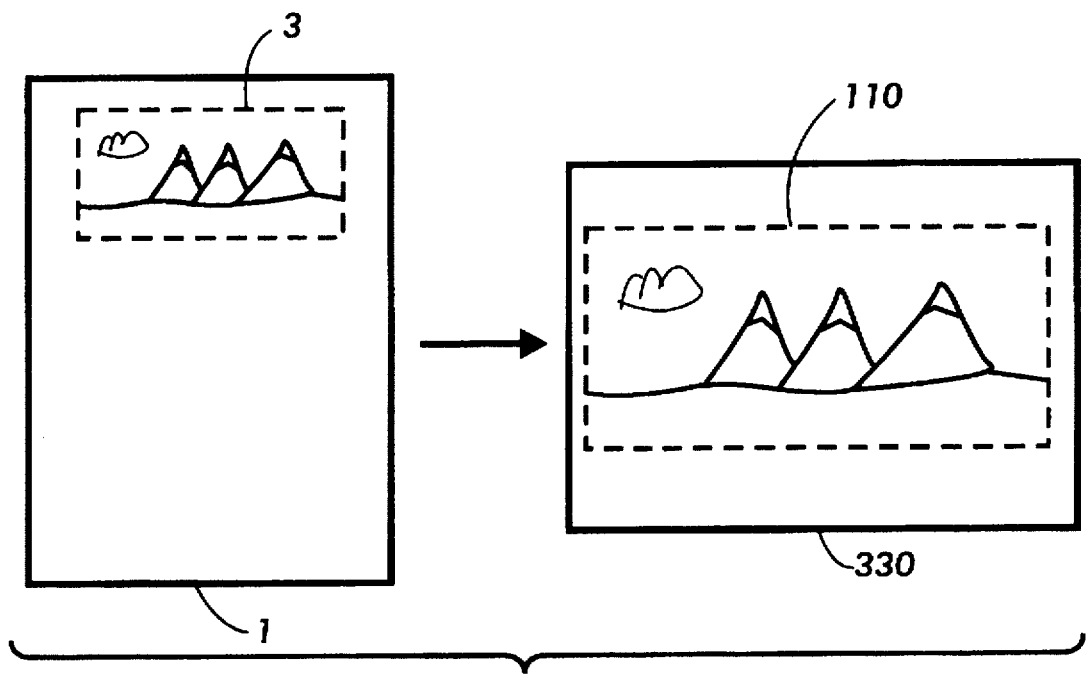
FIG. 5 is an illustration showing a third graphical representation of the concepts of the present invention.
Figure 6:
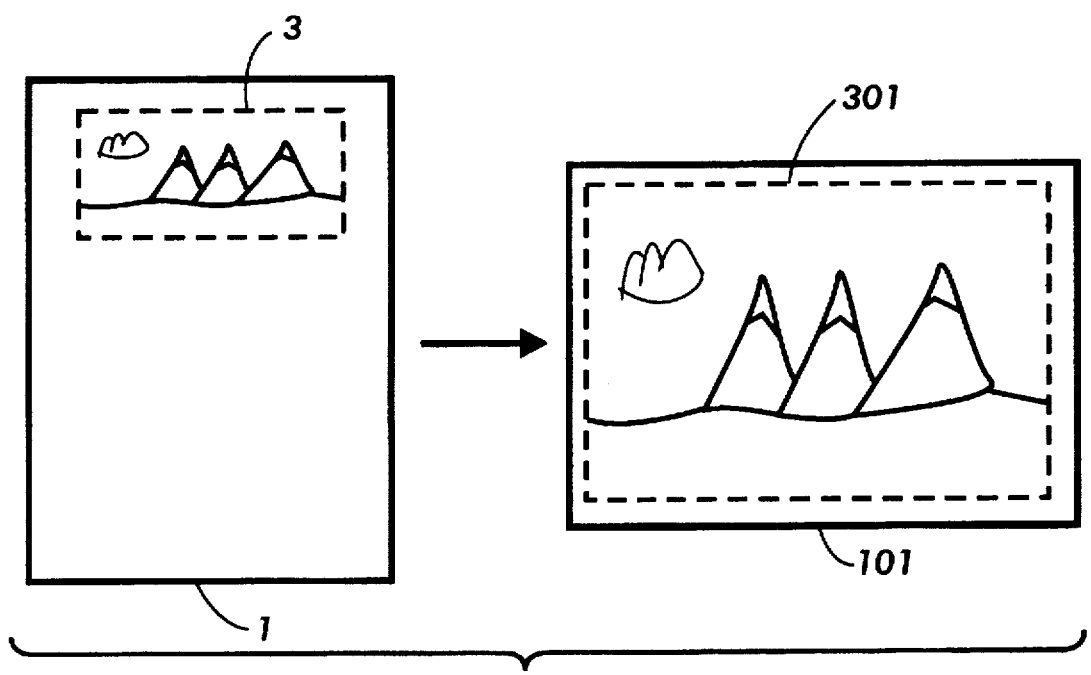
FIG. 6 is an illustration showing a fourth graphical representation of the concepts of the present invention.

As illustrated in FIG. 5, the magnification factor can be calculated isotropically (proportionally) so that the input document 1 having an image area 3 is scaled proportionally, allowing the output image 330 to be centered accordingly on the output document 110. Also, the magnification factor of the present invention can be calculated anamorphically (nonproportionally) as illustrated in FIG. 6. In this example, the input document 1 having the input image area 3 is nonproportionally scaled to fit the output document 101 with the output image 301.

In the preferred embodiment of the present invention, the output image is centered on the desired output document so as to leave a 10 mm border around the scaled image. This border is produced notwithstanding the magnification factor setting process utilized by the present invention or whether the present invention utilizes rotation where fitting input image on the output document.

Figure 7:
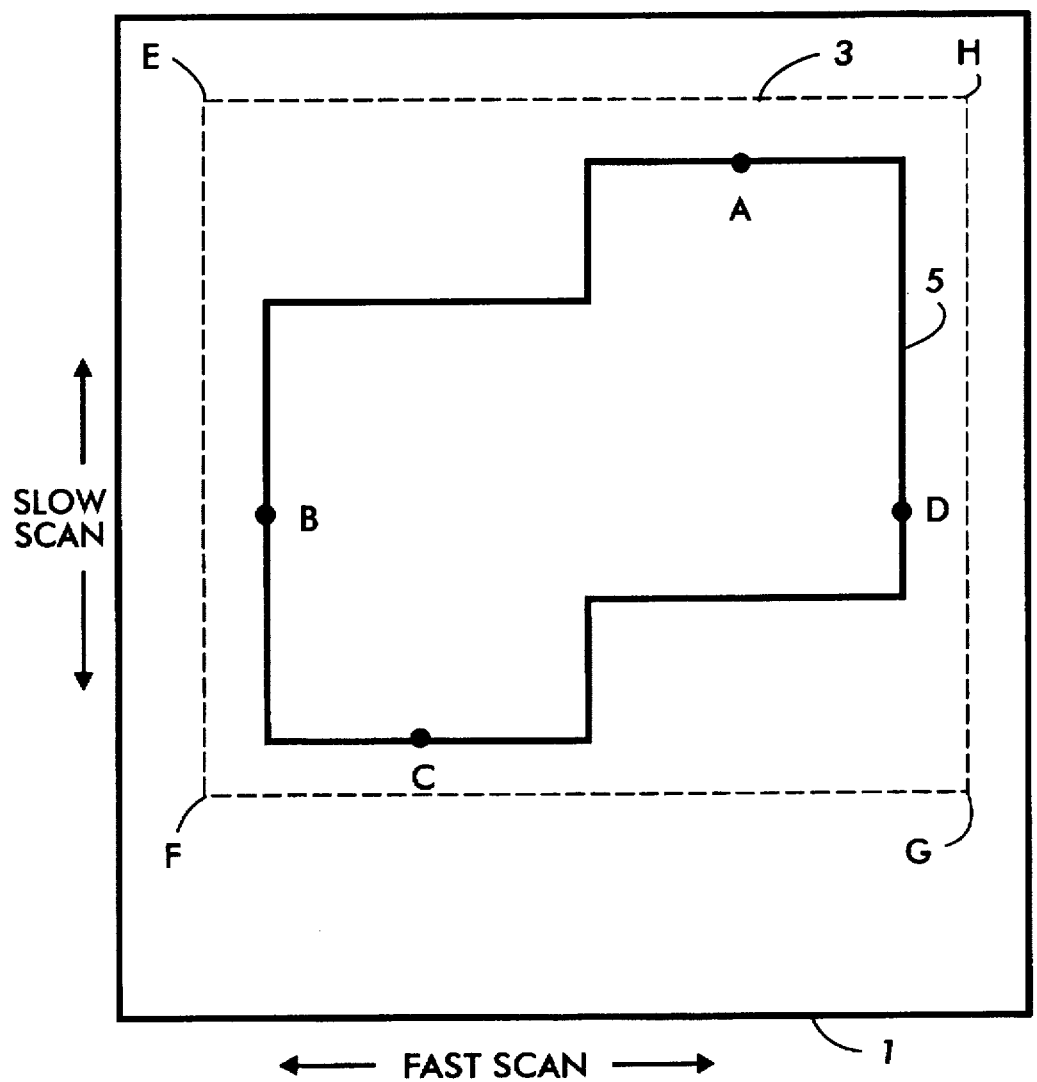
FIG. 7 is an illustration showing a graphical representation of the determination of the size of the input image area.

FIG. 7 illustrates an example as how the image area is defined by the present invention. In this example, the actual image is defined by the box 5. The image area as calculated by the present invention is represented by the dashed box 3. In the preferred embodiment of the present invention, the dashed box 3 would go through the points A, B, C, and D; however for illustrative purposes only, FIG. 7 shows this dashed box as being separate from these points to assist in delineating the boxes for explanation purposes.

As discussed above, the present invention analyzes all the pixels of image data received from the scanning system to classify whether the pixels are part of the image area or not. Once the pixels have been classified as such, the present invention analyses the entire set of pixels representing the input document 1 to determine the coordinate values of the extreme pixels in both the fastscan direction and slowscan direction of the input document.

In the example illustrated in FIG. 7, the points A and C represent the pixels in the extreme locations in the slowscan direction, whereas the points B and D represent the position of the pixels in the extreme locations in the fastscan direction.

After these points have been established, the present invention establishes the coordinate values of the corners of the image area, E, F, G, and H. These coordinate values will be used in the actual auto-fitting process. More specifically, the present invention establishes the coordinate values of corner E as having a fastscan coordinate value corresponding to the fastscan coordinate value of point B and a slowscan coordinate value corresponding to the slowscan coordinate value of point A. Moreover, the present invention establishes the coordinate values of corner F as having a fastscan coordinate value corresponding to the fastscan coordinate value of point B and a slowscan coordinate value corresponding to the slowscan coordinate value of point C. The coordinate values of corner G is established by assigning its fastscan coordinate value to be equal to the fastscan coordinate value of point D and its slowscan coordinate value to be equal to the slowscan coordinate value of point C. Lastly, the present invention establishes the coordinate values corner H as having a fastscan coordinate value equal to the fastscan coordinate value of point D and a slowscan coordinate value equal to the slowscan coordinate value of point A.

In this way, the present invention establishes a rectangular image area notwithstanding the actual shape of the image area on the input document. This rectangular image area can then be easily utilized in the scaling process to properly fit the actual image area on the output document.

In a preferred embodiment of the present invention, a user places the input document on a platen glass and selects the feature of auto-fitting along with the desired output paper size. The scanner then does a prescan of the input document to determine the location and size of the image within the input document. The area of the image is defined in terms of a rectangular area as described with respect to FIG. 7. In the preferred embodiment of the present invention, the image area is defined as a rectangular area encompassing all area of the input document where the reflectance of the image data is less than 20% of the reflectance value of the input documents background. Therefore, there can be only one image area per input document.

Once the image area has been defined, a magnification factor is calculated. In the preferred embodiment of the present invention, the input document is then rescanned applying the calculated magnification factor and properly registered so that the image area can be centered when it is rendered on to the desired output paper. As noted above, if the image area detected is such that the longer side of the rectangular area does not have the same orientation as the desired output paper, the image will be automatically rotated prior to the magnification and registering processes. The magnification factor can be calculated either anamorphically or isotropically.

Although the present invention has been described in detail above, various modifications can be implemented without departing from the spirit of the present invention. For example, the preferred embodiment of the present invention has been described with respect to a platen scanning apparatus. However, the platen scanning system can be replaced with a constant velocity transport system wherein the scanning system is stationary and the document page to be scanned is passed over the scanning system so as to provide the relevant movement between the scanning system and the document page. In such a system, the document pages are continually moving past the scanning station so as to save time in the scanning process.

While the present invention has been described with reference to various embodiments disclosed above, it is not to be limited to the details set forth above, but is intended to cover such modifications or changes as may fall within the scope of the attached claims.

What is claimed is:

1. A method for automatically fitting an image of an input document onto an output document, comprising the steps of:

(a) scanning a predetermined portion of the input document;

(b) generating pixels of image data from scanning the predetermined portion of the input document;

(c) generating a background value from the pixels of image data corresponding to the predetermined portion of the input document;

(d) scanning a remaining portion of the input document (e) generating pixels of image data from scanning the remaining portion of the input document;

(f) comparing a reflectance value of the pixels of image data corresponding to the remaining portion of the input document with a predetermined threshold value corresponding to the generated background value;

(g) identifying a pixel of image data as a pixel corresponding to an image when the reflectance value of the pixel of image data is less than the predetermined threshold;

(h) establishing a single image area based the pixels corresponding to the image so as to identify and isolate the image on the input document;

(i) determining a size of the single image area;

(j) determining a size of the output document;

(k) scaling only the single image area to correspond to the size of the output document; and (l) rendering the scaled image area on the output document.

2. The method as claimed in claim 1, wherein said step (j) determines the size of the output document through a sensor associated with a paper tray.

3. The method as claimed in claim 1, wherein the predetermined threshold is equal to 20% of the background value.

4. The method as claimed in claim 1, wherein said step (g) identifies the generated pixels of image data as being part of the image area when reflectance values of two adjacent pixels of image data are less than the predetermined threshold.

5. The method as claimed in claim 4, wherein the predetermined threshold is equal to 20% of the background value.

6. The method as claimed in claim 1, wherein said step (j) determines the size of the output document through a selection received from a user interface.

* * * * *